United States Patent [19]

Johnston

[11] Patent Number: 5,040,365
[45] Date of Patent: Aug. 20, 1991

[54] V-SHAPED LAWN RAKING APPARATUS

[76] Inventor: Gary L. Johnston, Baton Rouge, La.

[21] Appl. No.: 604,150

[22] Filed: Oct. 29, 1990

[51] Int. Cl.⁵ .............................................. A01D 7/04
[52] U.S. Cl. ................................................. 56/400.14
[58] Field of Search ........... 56/400.01, 400.04, 400.05, 56/400.08, 400.09, 400.11, 400.13, 400.14

[56]  References Cited
U.S. PATENT DOCUMENTS 1,246,577  11/1917  Fleming ........................... 56/400.04
2,545,001  3/1951  Mattmann ........................ 56/400.08
2,749,693  6/1956  Harsh ............................... 56/400.04
4,635,429  1/1987  Cornelius ....................... 56/400.14 X Primary Examiner—Thuy M. Bui

[57] ABSTRACT

A wheeled rake apparatus (10) including a wheeled unit (11) adapted to detachably receive a generally V-shaped framework member (20) having downwardly angled arm segments (22,23) provided with rake teeth (26) for removing and collecting debris as the apparatus (10) is pushed across a lawn.

11 Claims, 3 Drawing Sheets

V-SHAPED LAWN RAKING APPARATUS

TECHNICAL FIELD

The present invention relates to the field of lawn rakes in general, and in particular to a wheeled lawn rake having a unique configuration, as well as an enhanced capacity for accumulating leaves as the raking progresses.

BACKGROUND ART

As can be seen by references to the following U.S Pat. Nos. 4,009,560; 4,516,393; 4,635,429; and 4,821,500; the prior art is replete with myriad and diverse leaf raking devices.

While all of the aforementioned prior art constructions are more than adequate for the basic purpose and function for which they have been specifically designed, these prior art devices rely on antiquated physical principles and structures which multiply the time and effort that must be devoted to a relatively simple and straightforward task.

As anyone who is engaged in lawn maintenance is all too painfully aware, one of the most bothersome and time consuming tasks associated with that pursuit involves the removal of leaves, mowed grass, and other debris from the lawn.

Not only is the act of raking a time consuming chore, but it also must be done each time the lawn is mowed and on a periodic basis during the fall leaf season.

Most of the prior art devices that have been developed to accomplish this task have used the time proven, yet relatively inefficient, pulling of the rake across discrete contiguous areas on the lawn repeatedly, until such time as the entire surface area of the lawn has been cleared of debris.

As a consequence of the foregoing situation, there has existed a longstanding need among the general populace for a more efficient method of raking debris from a lawn and the provisions of such a construction is a stated objective of the present invention.

DISCLOSURE OF THE INVENTION

Briefly stated, the wheeled leaf raking apparatus that forms the basis of the present invention comprises a wheeled unit and a rake body unit. The wheeled unit comprises an attachment member that is adapted to receive the rake body unit and is further provided with an elongated handle element that is employed to move the wheeled unit member and the rake body unit as a single structural unit.

The rake body unit is provided with a generally V-shaped configuration and includes a support framework which is adapted to be received by the attachment member to operatively secure the rake body unit to the wheeled unit.

In addition, as will be explained in greater detail further on in the specification, the support framework is also provided with inwardly angled sidewalls having a plurality of rake teeth. The angled sidewalls form an open ended V-shaped reservoir for the debris that are accumulated by the rake body unit.

Furthermore, inasmuch as the rake body unit is loosely supported relative to the wheeled unit, the rake body unit will follow the contour of the land disposed immediately ahead of the direction of travel of the wheeled unit, such that the maximum amount of debris will be directed into the debris reservoir mentioned supra.

BRIEF DESCRIPTION OF THE DRAWINGS

These and other attributes of the invention will become more clear upon a thorough study of the following description of the best mode of carrying out the invention, particularly when reviewed in conjunction with the drawings, wherein.

BEST MODE FOR CARRYING OUT THE INVENTION

Figure 1:
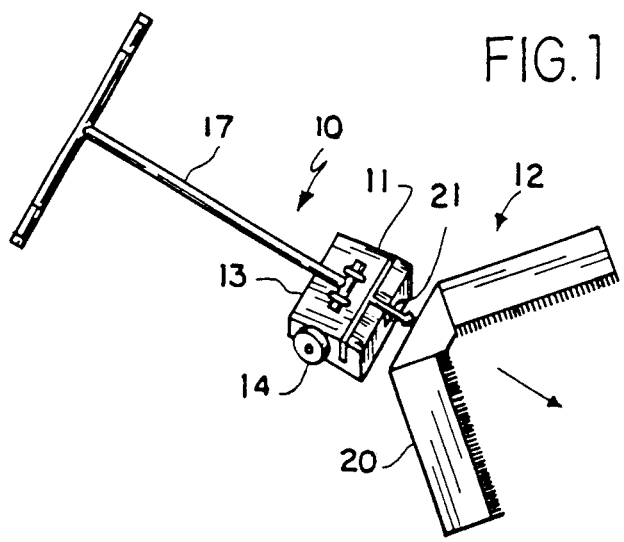
FIG. 1 is a perspective view of one embodiment of the lawn raking apparatus that forms the basis of the present invention.

As can be seen by reference to the drawings, and in particular to FIG. 1, the wheeled lawn rake apparatus that forms the basis of the present invention is designated generally by the reference numeral (10). The apparatus (10) comprises in general, a wheeled unit (11) and rake body unit (12). These units will now be described in seriatim fashion.

Figure 2:
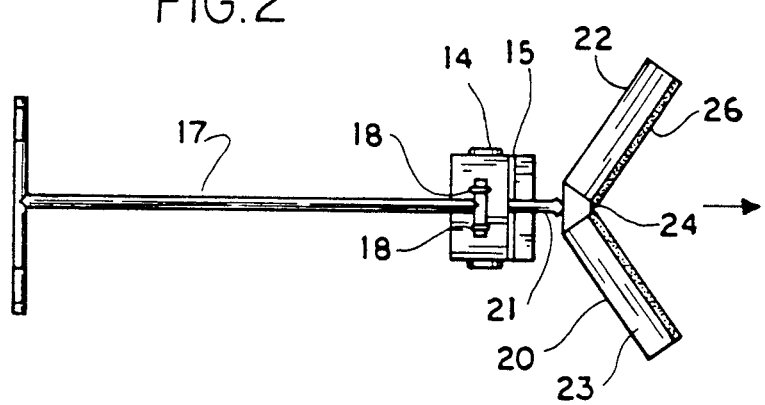
FIG. 2 is a top plan view of the apparatus.
Figure 3:
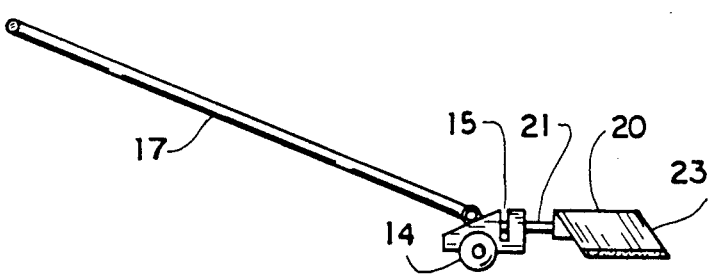
FIG. 3 is a side plan view of the apparatus.

As shown in FIGS. 2 and 3 in the first version of the preferred embodiment, the wheeled unit (11) comprises a wheeled body member (13) supported on wheels (14) in a well recognized fashion. The front portion of the wheeled body member (13) is provided with an elongated transverse slot (15) intersected by a relatively short longitudinal slot (16) which extends through the face of the wheeled body member (13) to form a generally T-shaped configuration.

In addition, the wheeled body member (13) is further provided with an elongated handle member (17) which is pivotally secured to the rear portion of the wheeled body member (13) via suitable brackets (18) or the like.

Still referring to FIGS. 2 and 3, it can be seen that the first version of the rake body unit (12) comprises a generally V-shaped framework member (20) having a T-shaped extension element (21) projecting outwardly from the inboard end of the framework member (20). The T-shaped extension element (21) is dimensioned to be loosely received in the slots (15, 16) to operatively and pivotally engage the rake body unit (12) to the wheeled unit (11).

Turning now to FIGS. 2 through 6, it can be seen that the framework member (20) further comprises two inwardly angled arm segments (22, 23) which are connected together by an intermediate segment (24). Each of the segments (22, 23, 24) have a downwardly angled face (25).

In addition, the faces (25) of the segments (22, 23, 24) are provided with a plurality of downwardly angled teeth (26) whose purpose and function will be described presently.

Figure 4:
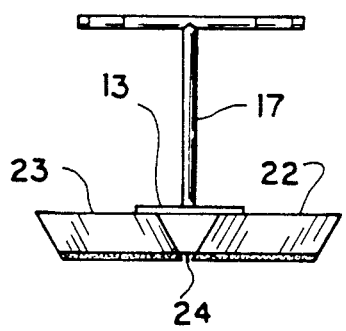
FIG. 4 is a front plan view of the apparatus.
Figure 6:
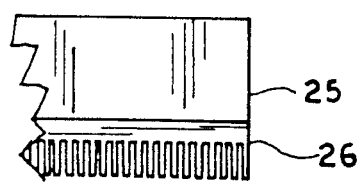
FIG. 6 is an isolated side view of the angled walls and teeth of the rake body unit.
Figure 5:
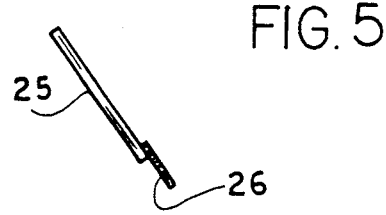
FIG. 5 is an enlarged front view of a portion of the rake body unit.

As can be seen in particular by references to FIGS. 2 and 4, as the apparatus (10) is pushed forward, the rake teeth (26) engage debris resting on the lawn and force the debris to travel upwardly along the angled face of the rake teeth (26) and then the segments (22, 23, 24). The debris are collected in an open receptacle defined by the dashed lines in FIGS. 2 and 4.

In addition, since the rake body unit (12) moves freely with respect to the wheeled unit (11), the framework member (20) and the teeth (26) will follow the contour of the lawn to capture the maximum amount of debris possible within the aforementioned open receptacle.

It should be appreciated by now that the apparatus greatly simplifies the chore of raking a lawn using a pushing versus a pulling force applied by the user. The enlarged capacity of the receptacle defined by the angled faces (25) of the segments (22, 23, 24) and rake teeth (26) minimizes the number of times that the collecting debris have to be removed from the apparatus.

In the second version of the preferred embodiment depicted in FIGS. 7 through 11, it is to be understood that while the basic configuration of the rake body unit (112) remains the same, the wheeled unit (111) and the operative connection between the wheeled unit (111) and the rake body unit (112) are different.

Figure 8:
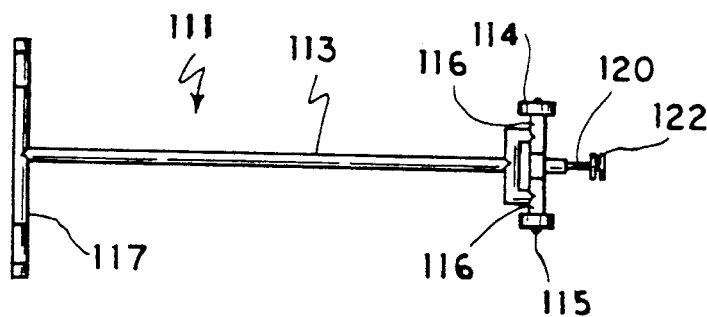
FIG. 8 is a isolated top plan view of the second version of the wheeled unit.
Figure 7:
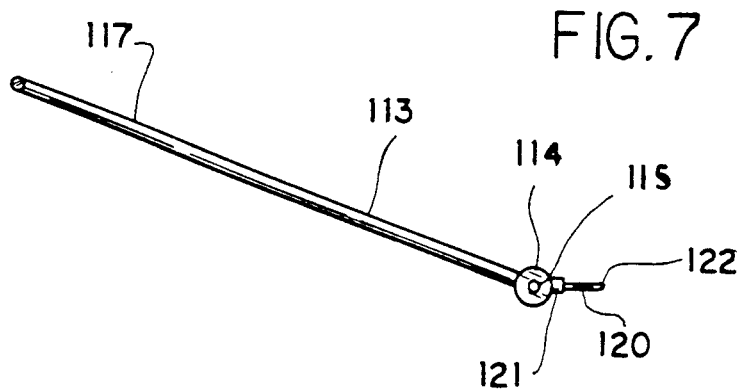
FIG. 7 is a side plan view of the second version of the wheeled unit.

As shown in FIGS. 7 and 8, the wheeled unit (111) comprises an elongated tubular framework (113) mounted on a wheel assembly include a pair of wheels (114) mounted on an axle (115). In addition, the inboard end of the tubular framework (113) comprises a pair of spaced bifurcated tubular arms (116) having aligned openings which are dimensioned to rotatably receive the axle (115), wherein the outboard end of the tubular framework (113) comprises an elongated handle member (117).

Still refering to FIGS. 7 and 8, it can be seen that the tubular framework (113) further comprises a connector member (120) which comprises a generally T-shaped hollow tubular coupling element (121) wherein the arms of the coupling element (121) are rotatably displosed on the axle (115) and located intermediate the bifurcated tubular arms on the inboard end of the tubular framework (113).

Furthermore, the stem of the coupler element (121) is further connected to a generally H-shaped connecting element (122) whose purpose and function will be described presently.

Figure 9:
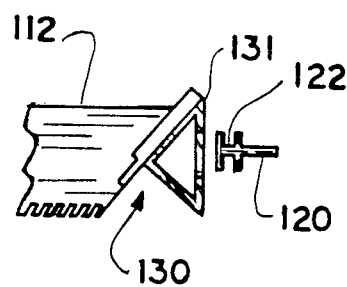
FIG. 9 and 10 depict the operative engagement between the second version of the wheeled unit and the second version of the rake body unit.
Figure 10:
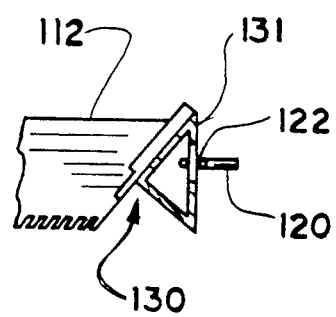
Figure 11:
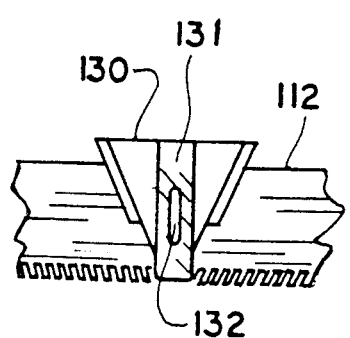
FIG. 11 is an isolated rear plan view of the mounting bracket on the second version of the rake body unit.

Turning now to FIGS. 9 through 11, it can be seen that the rear portion of the rake body unit (112) is provided with a generally open triangular mounting bracket (130) having a downwardly depending bracket arm (131) provided with an elongated aperture (132) which is dimensioned to be received at least the leading portion of the generally H-shaped connecting element (122) when connecting element (122) is oriented relative to the aperture (132) as depicted in FIGS. 9.

Then in order to operatively engage the wheeled unit (111) to the rake body unit (112) the connecting element is rotated 90 degrees relative to the aperture (132) so that the arms of the H-shaped connecting element engage the bracket arm (131) as depicted in FIGS. 10.

By now it should be appreciated that both the framework (113) and the connecting member (120) are rotatably disposed relative to the axle (115), and that the rake body unit (112) is vertically displaceable relative to the connector member (120).

In the third version of the preferred embodiment depicted in FIGS. 12 through 16, it is to be understood that while the basic configuration of the rake body unit (212) and the wheeled unit (211) remain the same, there does not exists any type of operative connection between the two.

Figure 13:
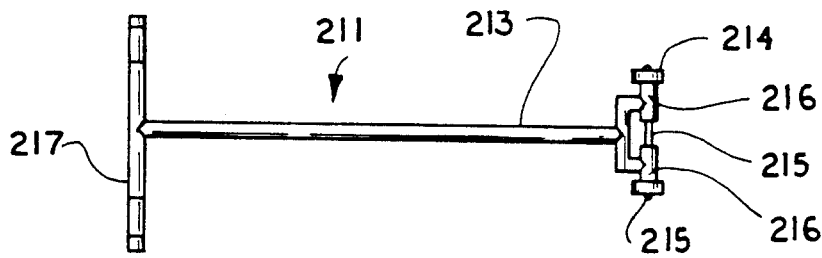
FIG. 13 is an isolated top plan view of the third version of the wheeled unit.
Figure 12:
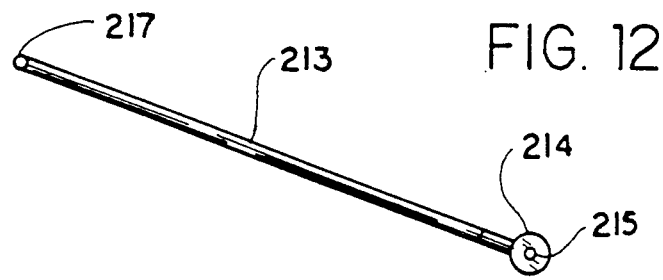
FIG. 12 is a side plan view of the third version of the wheel unit.

As shown in FIGS. 12 and 13, the wheeled unit (211) still comprises an elongated tubular framework (213) mounted on a wheel assembly including a pair of wheels (214) mounted on an axle (215). As in the second version, the inboard end of the tubular framework (213) comprises also a pair of bifurcated tubular arms (216) having aligned openings. However, in this third version, the openings are dimensioned to rotatably receive the axle (215) of the wheeled unit (211), wherein the outboard end of the tubular framework (213) comprises an elongated handle member (217).

Figure 14:
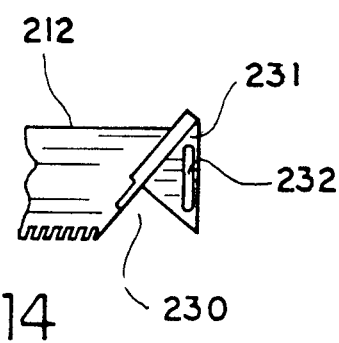
FIG. 14 and 15 depict the operative engagement between the third version of the wheeled unit and the third version of the rake body unit.
Figure 15:
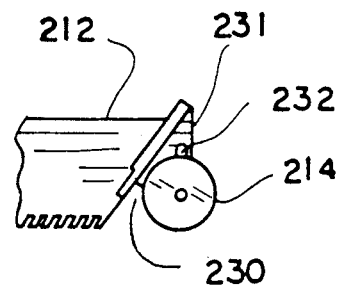
Figure 16:
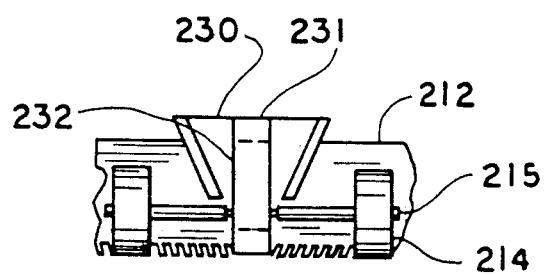
FIG. 16 is an isolated rear plan view of the mounting bracket of the third version of the rake body unit.

Turning now to FIGS. 14 through 16, it can be seen that the rear portion of the rake body unit (212) is provided with a generally solid triangular mounting bracket (230) having a downwardly depending bracket arm (231) provided with an elongated aperture (232) through the side of the mounting bracket (230) which is dimensioned to loosely receive the axle (215) of the wheeled unit (211) intermediate the bifurcated tubular arms (216). Therefore, the rake body unit (212) is vertically and rotatably displaceable relative to the axle (215) of the wheeled unit (211).

Having thereby described the subject matter of the present invention, it should be apparent that many substitutions and variations of the invention are possible in light of the above teachings. It is therefore to be understood that the invention as taught and described herein is only to be limited to the extent of the breadth and scope of the appended claims.

I claim:

1. A wheeled rake apparatus comprising:
a wheeled unit including a pivoted handle for moving the wheeled unit in a forward direction; and
a rake body unit pivotally and detachably connected to the wheeled unit wherein the rake body unit further includes a generally V-shaped framework member having inboard and outboard ends and downwardly angled arm segments provided with a plurality of downwardly depending rake teeth.

2. The apparatus as in claim 1 wherein the framework member is further provided with a downwardly angled intermediate segment which also has a plurality of downwardly depending rake teeth.

3. The apparatus as in claim 1 wherein the wheeled unit comprises a wheeled body member.

4. The apparatus as in claim 3 wherein the rake body unit is pivotally and detachably connected to the said wheeled body member.

5. The apparatus as in claim 4 wherein the wheeled body member is further provided with an elongated transverse slot and a relatively short longitudinal slot which extends through the face of the wheeled body member.

6. The apparatus as in claim 5 wherein the inboard end of the framework unit is provided with an outwardly extending T-shaped element which is dimensioned to be loosely received in the said slots of the wheeled body member.

7. The apparatus as in claim 1 wherein the wheeled unit comprises an elongated tubular framework rotatably secured to the axle of the wheel assembly.

8. The apparatus as in claim 7 wherein the wheeled unit further comprises a connector member rotatably secured to said axle.

9. The apparatus as in claim 8 wherein the rake body unit further comprises a mounting bracket dimensioned to releasably receive said connector member such that the connector member is vertically displaceable relative to the mounting bracket when the connector member is operatively engaged with the said mounting bracket.

10. The apparatus as in claim 1 wherein the wheeled unit comprises an elongated tubular framework rotatably secured to the axle of a wheeled assembly.

11. The apparatus as in claim 10 wherein the rake body unit further comprises a mounting bracket dimensioned to loosely receive the axle of the said wheeled unit such that the rake body unit is vertically and rotationally displaceable along the said wheeled unit axle.

* * * * *